United States Patent [19]

Collette

[11] Patent Number: 4,589,224

[45] Date of Patent: May 20, 1986

[54] WIRE MAT TURF PROTECTOR

[76] Inventor: Dorothy A. Collette, 1040 Apple, Hoffman Estates, Ill. 60195

[21] Appl. No.: 646,799

[22] Filed: Sep. 4, 1984

[51] Int. Cl.⁴ .............................................. A01G 1/04
[52] U.S. Cl. ........................................ 47/1 R; 47/25; 47/31; 47/32
[58] Field of Search ...................... 47/25, 1, 23, 32, 24, 47/26, 31; 15/215, 238; 220/19; 5/417; 108/130, 132

[56] References Cited

U.S. PATENT DOCUMENTS

| | | | |
|---|---|---|---|
| 1,453,810 | 5/1923 | Sleen | 47/25 |
| 1,718,386 | 6/1929 | Sherwood | 15/215 |
| 2,102,748 | 12/1937 | Rocquin | 47/25 |
| 4,046,261 | 9/1977 | Yake | 220/19 |

FOREIGN PATENT DOCUMENTS 575889  8/1924  France .................................. 47/25

Primary Examiner—Robert A. Hafer
Assistant Examiner—Bradley M. Lewis
Attorney, Agent, or Firm—Dillis V. Allen

[57] ABSTRACT

A wire mat turf and soil protector that covers newly repaired soil areas to prevent animals, and particularly dogs, from digging holes, and also supports the soil and turf during grass regrowth.

2 Claims, 6 Drawing Figures

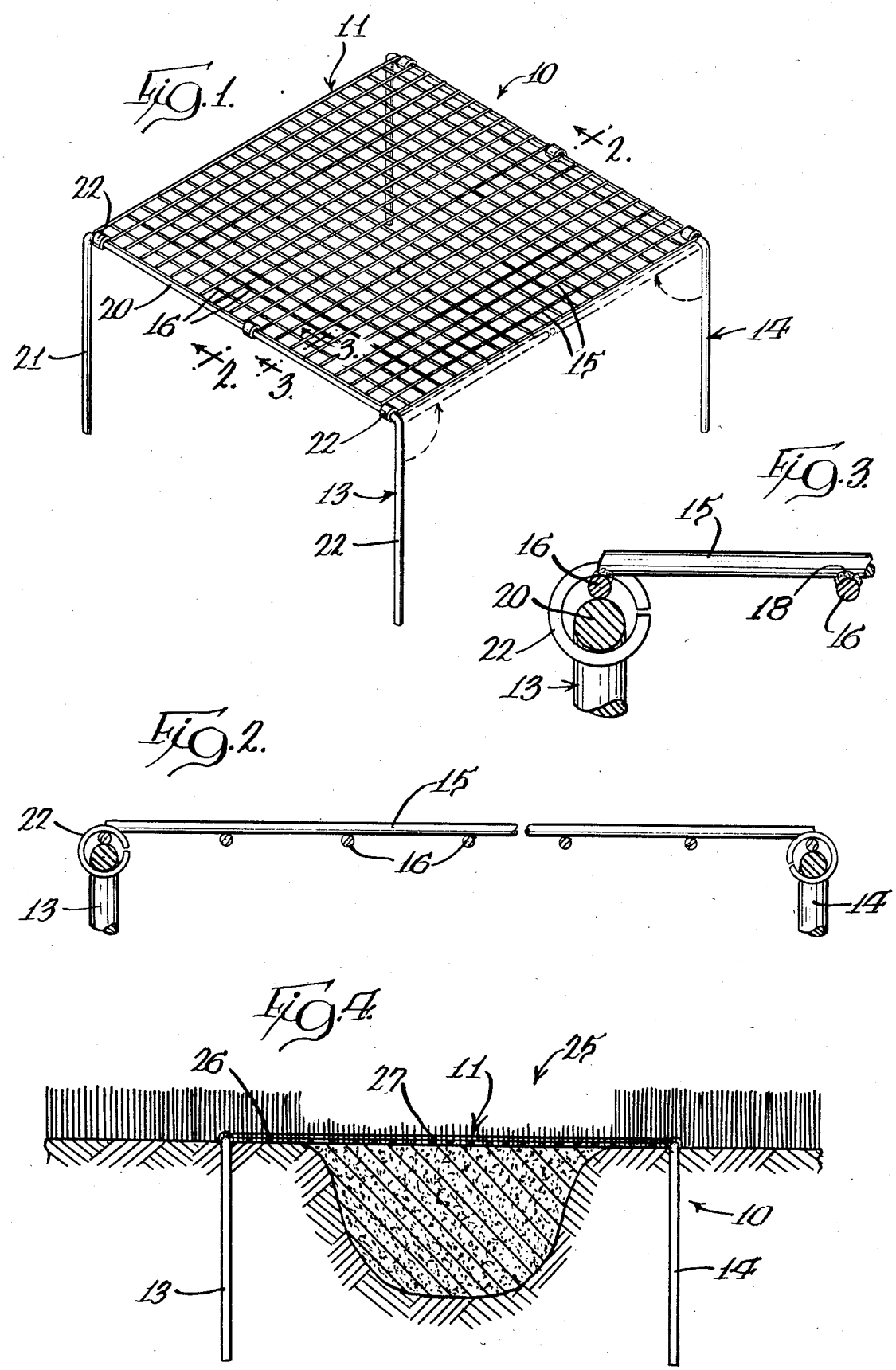

WIRE MAT TURF PROTECTOR

BACKGROUND OF THE PRESENT INVENTION

Many animals, particularly dogs, have the undesirable habit of digging holes in grassed areas and flower beds and with some domestic animals it is extremely difficult to train the animal not to engage in such practice, even for experienced animal trainers. The repair of these damaged areas is frequently useless because the habitually digging animal returns to the same spot to dig again.

Furthermore, these repaired areas are also subject to damage from foot traffic of animals as well as humans. There have in the past been attempts to support turf in high traffic areas with a rectangular frame such as shown in the Partin U.S. Pat. No. 2,899,775. The Partin device must be installed prior to the original lawn building process since it is mounted significantly beneath the upper surface of the soil and serves no function whatsoever of inhibiting animal digging. A circular link mat for the purpose of protecting plants from animal intrusion is shown in the Erickson U.S. Pat. No. 3,055,143. The mat consists of circular links with sharp upwardly-projecting barbs that are intended to impale the animal's feet and thereby discourage traverse by the animal toward an adjacent area of plants. However, the Erickson device is undesirable because it physically and inhumanely injures the animal and also, because of its flexible construction it does not support the soil or turf.

It is the primary object of the present invention to ameliorate the problems noted above in protecting turf and soil during repair.

SUMMARY OF THE PRESENT INVENTION

In accordance with the present invention a rigid wire cloth mat is provided adapted to engage and hold the upper surface of soil or turf repair to support it and discourage repeated assault by the habitually digging animal.

Toward these ends the present protective mat includes a rigid wire cloth of one-half inch meshed 20 gauge wire, square in outer configuration, either twelve by twelve inches or eighteen by eighteen inches.

The square mesh or grid is free from protuberances or sharp edges to prevent injury to the animal and is galvanized steel or may be vinyl coated to further reduce the possibility of animal injury as well as to inhibit corrosion. A plurality of fastening elements is provided to attach the protective mesh to the upper surface of the soil or the upper surface of turf matting.

Since the mesh directly engages the upper surface of the soil or turf mat and is free from projections, it extends less than 0.100 inch above the soil or mat and hence does not interfere with lawn use or lawn maintenance equipment. In addition to protecting repaired and reseeded areas from repeated animal assault, this mesh also holds and supports the turf from vertical and lateral movement during regrowth caused by natural erosion and foot traffic.

Moreover, this protective mat is easy to install without the use of any tools.

BRIEF DESCRIPTION OF THE DRAWINGS

FIG. 1 is a perspective view of a protective mat according to the present invention;

FIG. 2 is a cross-section of the present mat taken generally along line 2—2 of FIG. 1;

FIG. 3 is a fragmentary section through the edge of the mat taken generally along line 3—3 of FIG. 1;

FIG. 4 is a soil cross-section illustrating the present protective mat in its implanted position;

DETAILED DESCRIPTION OF THE PREFERRED EMBODIMENTS

Figure 5:
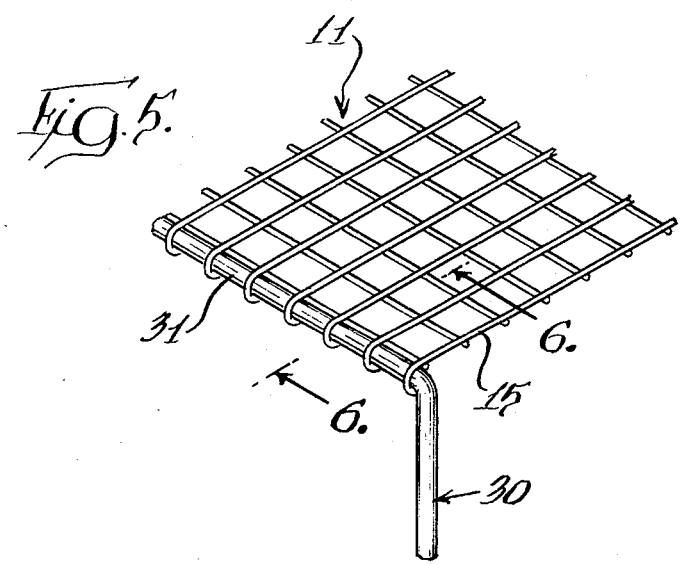
FIG. 5 is a perspective fragmentary view of a protective mat according to another embodiment of the present invention.

Referring to the drawings and particularly FIGS. 1 to 4, a protective mat 10 is illustrated according to the present invention including a rigid rectangular wire cloth or grid mesh 11 and U-shaped attachment assemblies 13 and 14.

The wire cloth 11 includes a plurality of parallel 20-gauge wires 15 spaced one-half inch apart welded at each juncture to a plurality of 20-gauge wires 16 spaced one-half inch apart. As seen in FIG. 3, a weldment 18 is provided at each and every juncture between wires 15 and 16 producing rigidity for the mat 11.

The U-shaped attachment or hold-down assemblies 13 and 14 each include a U-shaped 10-gauge wire having a straight bite portion 20 and downwardly depending leg portions 21 and 22 that are each approximately 6 inches in length. The hold-down or attachment assemblies 13 and 14 are pivotally attached to the wire mesh 11 by three clamping rings 22 that are crimped over the outer ones of the wires 16 and hold-down bight portion 20, as seen clearly in FIG. 3. The pivotal connection of the hold-down assemblies 13 and 14 to the mesh permit them to be folded substantially planar to the mesh as seen in dotted lines in FIG. 1 to facilitate the storage, handling and packaging of the protective mat 10.

As seen in FIG. 4, the mat 10 is installed over repaired area 25 that includes a soil refilled hole reseeded at its upper surface. The hold-down assemblies 13 and 14 are pressed into the soil until wire cloth 11 engages the upper surface 26 of the soil or turf matting and the upper surface 27 of the soil in the repaired and reseeded area. This engagement holds the soil in the repaired area in position. The low profile or minimal vertical extension, i.e. less than 0.100 inch, of the mat 11 above the soil surface permits the free travel of traffic across the repaired area as well as lawn mowing and care equipment without hindrance and without damage to the repaired area.

Figure 6:
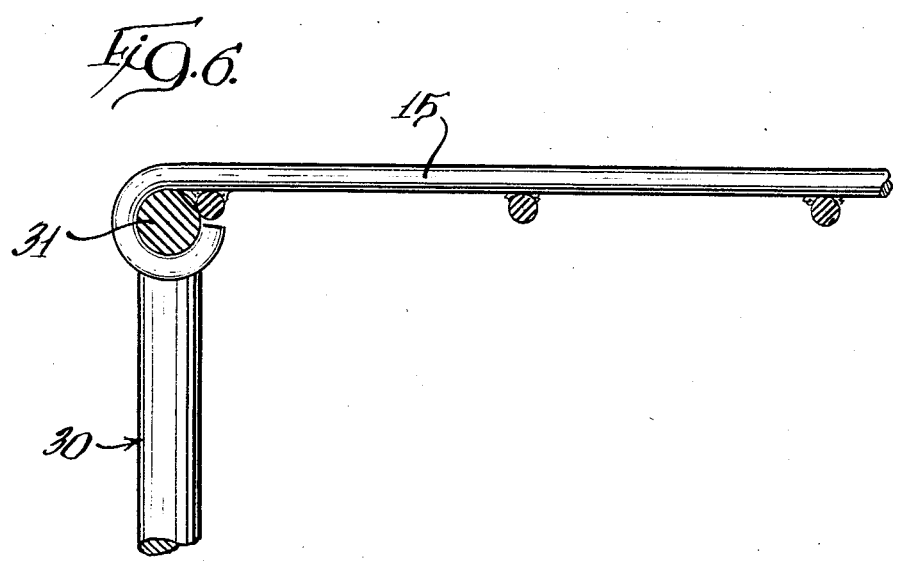
FIG. 6 is an enlarged fragmentary view taken generally along line 6—6 of FIG. 5.

As seen in FIG. 5 and 6 and as an alternative to the hold-down assemblies 13 and 14 shown in the FIGS. 1 to 4 embodiment, hold-down assemblies 30 may be provided that include U-shaped 10 gauge wire forms identical to the wire forms in the assemblies 13 and 14. However, instead of crimping clips 22, the ends of the wires 15 are formed around bight portion 31 to pivotally connect the hold-down assemblies 30 to the mesh 11.

The present protective mat not only protects the repaired area but also serves to discourage the animal from lawn digging and over a period of use it has been found to reduce and sometimes break the animal's habit of soil digging in general.

I claim:

1. A repaired soil or turf supporting and protecting device, comprising; a rectangular rigid self supporting grid of wire cloth including a plurality of rigid parallel wires attached to a plurality of orthogonally disposed rigid parallel wires, said parallel wires being spaced approximately one-quarter to one-half inch apart to protect soil and turf surfaces and prevent animal access, while freely permitting turf regrowth, said wires all being equal guage and being unsupported by any surrounding support, said grid having a smooth upper surface to prevent injury to digging animals, said grid having a flat lower surface adapted to engage the upper surface of soil or turf, said grid having a thickness of less than 0.100 inches to prevent animal injury and permit lawn care equipment to pass freely thereover, and a plurality of U-shaped protruding elements permanently pivotally connected directly to the wires of this grid and extending orthogonally therefrom to attach the grid to the upper surface of the soil or turf, said attaching elements extending only from one side of grid said U-shaped protruding elements having a bight portion parallel to the wires to which they are connected.

2. A reapired soil or turf supporting and protecting device as defined in claim 1, wherein the grid is vinyl-coated to reduce animal injury.

* * * * *